(12) United States Patent
Fujitake (10) Patent No.: US 11,535,119 B2
(45) Date of Patent: Dec. 27, 2022

(54) CONTROL OF THE STATE OF CHARGE OF AN ELECTRICALLY POWERED VEHICLE WHEN TRAVELING ON A HILL

(71) Applicant: TOYOTA JIDOSHA KABUSHIKI KAISHA, Toyota (JP)

(72) Inventor: Yoshinori Fujitake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 16/412,905

(22) Filed: May 15, 2019

(65) Prior Publication Data

US 2019/0366873 A1 Dec. 5, 2019

(30) Foreign Application Priority Data

May 30, 2018 (JP) .............................. JP2018-103719

(51) Int. Cl.
| | | |
|---|---|---|
| *B60L 58/13* | (2019.01) | |
| *B60L 15/20* | (2006.01) | |
| *B60K 6/22* | (2007.10) | |
| *B60W 20/13* | (2016.01) | |

(52) U.S. Cl.
CPC .............. *B60L 58/13* (2019.02); *B60L 15/20* (2013.01); *B60K 6/22* (2013.01); *B60W 20/13* (2016.01); *B60Y 2200/91* (2013.01); *B60Y 2200/92* (2013.01); *B60Y 2300/181* (2013.01); *B60Y 2300/91* (2013.01)

(58) Field of Classification Search
CPC ...... B60L 58/13; B60L 15/20; B60L 15/2018; B60L 7/18; B60L 58/15; B60L 58/10; B60L 58/12; B60K 6/22; B60Y 2300/181; B60Y 2200/91; B60Y 2200/92; B60Y 2300/91; B60W 20/13; Y02T 10/70
See application file for complete search history.

(56) References Cited

U.S. PATENT DOCUMENTS

| | | | |
|---|---|---|---|
| 2012/0059543 A1 | 3/2012 | Nakazono et al. | |
| 2013/0085631 A1 | 4/2013 | Kim et al. | |
| 2014/0232302 A1 | 8/2014 | Tsushima | |
| 2014/0324261 A1* | 10/2014 | Amano | B60K 6/445 |
| | | | 701/22 |
| 2015/0105948 A1* | 4/2015 | Chang | B60L 58/13 |
| | | | 701/22 |

(Continued)

FOREIGN PATENT DOCUMENTS

| | | | |
|---|---|---|---|
| JP | 2000-270404 A | 9/2000 | |
| JP | 2013-048523 A | 3/2013 | |

(Continued)

*Primary Examiner* — James M McPherson
*Assistant Examiner* — Kyle J Kingsland
(74) *Attorney, Agent, or Firm* — Sughrue Mion, PLLC (57) ABSTRACT

An ECU controls charging of a power storage device such that an SOC of the power storage device does not exceed a prescribed upper control limit. When an electrically powered vehicle moves in a downhill direction with an MG generating travel torque in an uphill direction on an uphill road (downhill-movement state), the ECU allows charging in which the SOC exceeds the upper control limit. Further, when a request to stop a system of the vehicle is made with the SOC exceeding the upper control limit, the ECU performs a discharge process of discharging the power storage device.

5 Claims, 9 Drawing Sheets

(56) References Cited

U.S. PATENT DOCUMENTS

| | | | | |
|---|---|---|---|---|
| 2016/0167641 A1* | 6/2016 | Yoon | ............... | G08G 1/09626 |
| | | | | 701/22 |
| 2018/0134274 A1* | 5/2018 | Ogawa | ............... | B60W 10/08 |
| 2019/0276002 A1* | 9/2019 | Ito | ............... | B60W 10/26 |

FOREIGN PATENT DOCUMENTS

| | | |
|---|---|---|
| JP | 2013-74706 A | 4/2013 |
| JP | 2013-081355 A | 5/2013 |
| WO | 2010/103667 A1 | 9/2010 |
| WO | 2013/046250 A1 | 4/2013 |

* cited by examiner

CONTROL OF THE STATE OF CHARGE OF AN ELECTRICALLY POWERED VEHICLE WHEN TRAVELING ON A HILL

This nonprovisional application is based on Japanese Patent Application No. 2018-103719 filed on May 30, 2018 with the Japan Patent Office, the entire contents of which are hereby incorporated by reference.

BACKGROUND

Field

The present disclosure relates to electrically powered vehicles, and particularly, to an electrically powered vehicle including a motor generator that generates travel torque using power stored in a power storage device.

Description of the Background Art

Electrically powered vehicles such as electric vehicles (EVs) and hybrid vehicles (HVs) are known as environmentally friendly vehicles. The electrically powered vehicle includes a traveling motor that generates travel torque using power stored in a power storage device, for example, a battery. The traveling motor is configured as a motor generator (hereinafter, "MG") capable of generating regenerative torque to generate power during, for example, braking of the vehicle, and the traveling motor is operated as a generator to charge the power storage device during, for example, braking of the vehicle.

Japanese Patent Laying-Open No. 2013-48523 discloses that in such an electrically powered vehicle, a battery is charged to a fully charged state from a charging station.

Since a power storage device experiences accelerated degradation after being left in a high state of charge (SOC) for a long period of time, an upper control limit of the SOC is set to reduce such accelerated degradation, and the SOC is controlled not to exceed the upper control limit. Specifically, once the SOC reaches the upper control limit, charging of the power storage device is disabled assuming that the power storage device has reached the fully charged state.

If such an electrically powered vehicle moves backward in a downhill direction even though the MG outputs torque in an uphill direction while the vehicle is climbing a hill (hereinafter, such a situation is referred to as "downhill movement"), the torque in the uphill direction which is generated by the MG and the rotation speed of the MG have reverse signs, and accordingly, the MG enters the regenerative mode (power generation). In this case, when the SOC reaches the upper control limit due to charging of the power storage device, the power storage device cannot be charged, so that the MG in the regenerative mode can no longer output torque in the uphill direction. It is conceivable that the vehicle will be temporarily braked to stop and the MG will be operated in the power running mode; in such a case, however, a braking operation is required, leading to a possibility that a response can be delayed. It is therefore desirable that such a situation be overcome immediately without a braking operation.

SUMMARY

The present disclosure has been made to solve the above problem and has an object to provide an electrically powered vehicle capable of immediately resolving a downhill-movement state of a vehicle on an uphill road and reducing degradation of a power storage device.

An electrically powered vehicle in the present disclosure includes a power storage device, an MG, and a controller. The MG is configured to generate travel torque using power stored in the power storage device and generate power for charging the power storage device. The controller is configured to control the charging of the power storage device such that an SOC of the power storage device does not exceed a prescribed upper control limit. When the electrically powered vehicle moves in a downhill direction (downhill-movement state) with the MG generating travel torque in an uphill direction on an uphill road, the controller allows charging in which the SOC exceeds the upper control limit. Further, when a request to stop a system of the vehicle is made with the SOC exceeding the upper control limit, the controller performs a discharge process of discharging the power storage device.

At the occurrence of the downhill-movement state of the vehicle on the uphill road, the electrically powered vehicle allows charging in which the SOC exceeds the upper control limit. This avoids a situation in which MG cannot generate torque (regenerative torque) in the uphill direction because the SOC has reached the upper control limit and the power storage device cannot be charged. Consequently, the MG can output torque in the uphill direction and accordingly escape from the downhill-movement state.

When charging in which the SOC exceeds the upper control limit is allowed to leave the power storage device for a long period of time in the state in which the SOC exceeds the upper control limit (hereinafter, merely referred to as "high SOC state" as well), the degradation of the power storage device is accelerated. When a request to stop the system of the vehicle is made in the high SOC state, the electrically powered vehicle performs the discharge process of discharging the power storage device assuming that the power storage device is highly likely to be left in the high SOC state for a long period of time. For example, the SOC is reduced to the upper control limit through the discharge process. This reduces the accelerated degradation of the power storage device which is caused by the power storage device being left in the high SOC state.

Merely in the high SOC state without a request to stop the system (e.g., immediately after the downhill-movement state has been resolved by allowing charging in which the SOC exceeds the upper control limit), the MG consumes the power stored in the power storage device by travelling thereafter, so that the high SOC state starts to be resolved. Consequently, the discharge process is not performed.

When the electrically powered vehicle moves in the downhill direction with the motor generator generating the travel torque in the uphill direction on the uphill road (downhill-movement state), the controller may remove a restriction on the charging of the power storage device by allowable charging power (Win) indicating a maximum value of power receivable by the power storage device.

Consequently, high charging power is allowed, increasing the torque (regenerative torque) in the uphill direction which is generated by the MG. This resolves downhill movement of the vehicle, thereby allowing the vehicle to climb a hill.

The electrically powered vehicle may further include a system relay provided between the power storage device and an electric device that receives power from the power storage device. The power storage device may include a plurality of cells, and an equalization circuit configured to individually discharge each of the plurality of cells for equalizing storage power amounts of the plurality of cells.

The discharge process may include a process of operating the equalization circuit after the system relay is turned off in response to the request to stop the system.

Such a configuration can discharge the power storage device using the equalization circuit even after the system relay is turned off in response to the request to stop the system.

When the request to stop the system is made, the controller may turn off the system relay after performing a prescribed process. The discharge process may include a process of discharging, until the system relay is turned off in response to the request to stop the system, the power storage device by operating the electric device.

Consequently, also before the system relay is turned off in response to the request to stop the system, the power stored in the power storage device can be consumed by or stored in the electric device to discharge the power storage device. The electrically powered vehicle can thus perform the discharge process immediately after the request to stop the system, thereby stopping the system.

The controller may be configured to, when the request to stop the system is made with the SOC exceeding the upper control limit, perform the discharge process after a lapse of a prescribed period of time from the request to stop the system, and when the request to activate the system of the electrically powered vehicle is made before a lapse of the prescribed period of time, not perform the discharge process.

The power storage device does not experience accelerated degradation immediately after entering the high SOC state, but experiences accelerated degradation after being left in the high SOC state for a long period of time. The above configuration thus allows, while reducing accelerated degradation caused by the power storage device being left in the high SOC state for a long period of time, the power stored in the power storage device to be effectively used after activation of the system when a request to activate the system is made in a short period of time after the stop of the system.

The prescribed period of time by which whether to perform the discharge process is determined may be a period of time set at, for example, a design stage or can be set by a user who uses the electrically powered vehicle.

The electrically powered vehicle may further include a navigation device having map information. The controller may be configured to, when the request to stop the system is made with the SOC exceeding the upper control limit, acquire information about a current position of the electrically powered vehicle from the navigation device. The controller may be configured to perform the discharge process when the current position is a set prescribed location and to not perform the discharge process when the current position is not the prescribed location.

For example, when a request to stop the system is made in one's home, company, or the like, a vehicle is expected to stop for a long period of time after the stop of the system. Contrastingly, when a request to stop the system is made in, for example, a parking lot of a convenience store, the system is expected to be activated again for a short period of time after the stop of the system. The electrically powered vehicle can thus set, as a prescribed location, a location in which the discharge process is performed when a request to stop the system is made with the SOC exceeding the upper control limit (e.g., one' home, company, or the like in which the vehicle is expected to stop for a long period of time), and does not perform the discharge process when the current position is not the prescribed location, assuming that the system is highly likely to be activated again in a short period of time after the stop of the system. This allows, while reducing accelerated degradation of the power storage device which is caused by the power storage device being left for a long period of time in the high SOC state, the power stored in the power storage device to be effectively used after activation of the system when a request to activate the system is made in a short period of time after the stop of the system.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be described in detail with reference to the drawings. In the drawings, the same or corresponding parts are denoted by the same reference numerals, and the description thereof will not be repeated.

Overall Configuration of Electrically Powered Vehicle

Figure 1:
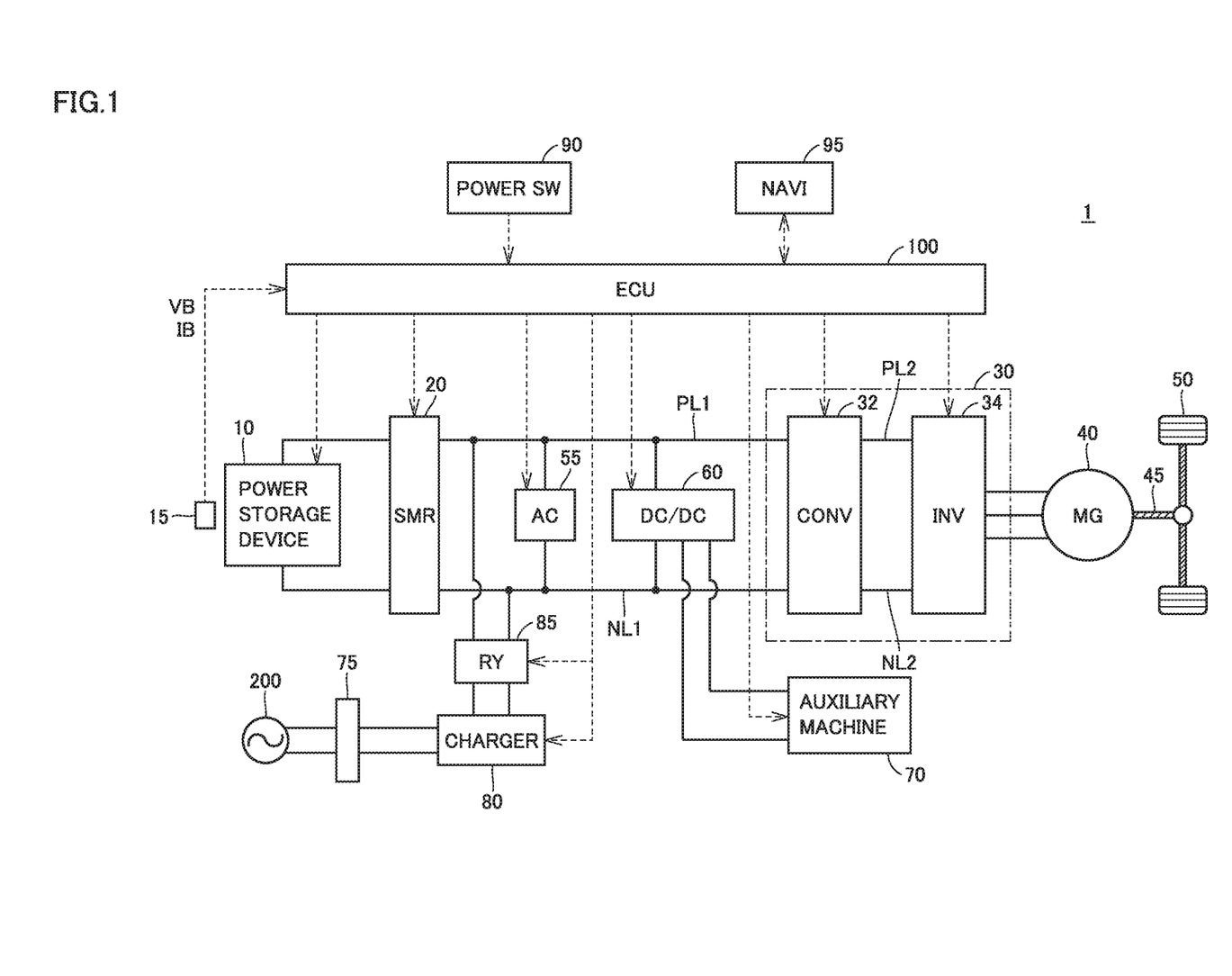
FIG. 1 shows an overall configuration of an electrically powered vehicle according to an embodiment.

FIG. 1 shows an overall configuration of an electrically powered vehicle according to the present embodiment. Although description will be representatively given of a case in which the electrically powered vehicle is an electric vehicle (EV) including no onboard engine, the electrically powered vehicle according to the present disclosure may be a hybrid vehicle (HV) including an onboard engine.

Referring to FIG. 1, an electrically powered vehicle 1 includes a power storage device 10, a sensor unit 15, a system main relay (hereinafter referred to as "SMR") 20, a power control unit (hereinafter referred to as "PCU") 30, a motor generator (hereinafter referred to as "MG") 40, a drive shaft 45, and drive wheels 50. Electrically powered vehicle 1 further includes an electrically powered air conditioner 55, a DC/DC converter 60, an auxiliary machine 70, a power receiver 75, a charger 80, and a charging relay 85. Electrically powered vehicle 1 further includes a power switch 90, a navigation device 95, and an electronic control unit (hereinafter referred to as "ECU") 100.

Power storage device 10 is a chargeable and dischargeable power storage element. Power storage device 10 includes, for example, a secondary battery such as a lithium-ion battery or nickel-hydride battery, and a power storage element such as an electric double layer capacitor. The lithium-ion secondary battery is a secondary battery having lithium as carriers and can include a typical lithium-ion secondary battery including a liquid electrolyte, as well as an all-solid-state battery including a solid electrolyte.

Power storage device 10 stores the power for driving MG 40 and can supply power to MG 40 through PCU 30. Power storage device 10 receives the power, which is generated by MG 40, to be charged through PCU 30 during power generation by MG 40 when, for example, a vehicle is braked. Further, power storage device 10 can receive the power, which is supplied through power receiver 75 from a power supply 200 outside the vehicle, to be charged (hereinafter, charging of power storage device 10 by power supply 200 is also referred to as "external charging").

Sensor unit 15 includes a sensor for monitoring the state of power storage device 10 and includes, for example, a voltage sensor and a current sensor. The voltage sensor detects a voltage VB across power storage device 10, and the current sensor detects a current IB flowing through power storage device 10. The voltage VB may include sub-voltages VB1, VB2, . . . VBn, respectively flowing through voltage sensors 16 and current sensor 17. The detection value of each sensor is transmitted to ECU 100.

System main relay 20 is provided between power storage device 10 and a pair of power lines PL1 and NL1 and is turned on/off by ECU 100.

PCU 30 includes a converter 32 and an inverter 34. Converter 32 is provided between the pair of power lines PL1 and NL1 and a pair of power lines PL2 and NL2 and boosts the voltage between the pair of power lines PL2 and NL2 to a voltage between the pair of power lines PL1 and NL1 or a higher voltage, based on a driving signal from ECU 100. Converter 32 is formed of, for example, a current-reversible boost chopper circuit.

Inverter 34 is provided between the pair of power lines PL2 and NL2 and MG 40 and drives MG 40 based on a driving signal from ECU 100. Inverter 34 is formed of, for example, a bridge circuit including switching elements for three phases.

MG 40 is an AC rotating electrical machine, for example, a three-phase AC synchronous motor including a rotor having a permanent magnet embedded therein. MG 40 is driven by inverter 34 to generate a rotational driving force. The driving force generated by MG 40 is transmitted to drive wheels 50 through drive shaft 45. During braking of a vehicle, for example, MG 40 operates as a generator and generates power. The power generated by MG 40 is supplied to power storage device 10 through PCU 30.

Electrically powered air conditioner 55 is connected to the pair of power lines PL1 and NL1 and is configured to operate upon receipt of power from the pair of power lines PL1 and NL1. Electrically powered air conditioner 55 controls the in-vehicle temperature of electrically powered vehicle 1 based on a control signal from ECU 100.

DC/DC converter 60 is connected to the pair of power lines PL1 and NL1 and is configured to lower the power received from the pair of power lines PL1 and NL1 to a voltage level of the auxiliary machine and supply it to auxiliary machine 70, based on a control signal from ECU 100. Auxiliary machine 70 collectively shows various auxiliary machines and auxiliary machine batteries mounted in electrically powered vehicle 1.

Power receiver 75 receives the power supplied from power supply 200 outside the vehicle and outputs it to charger 80. Power receiver 75 may be formed of an inlet connectable with a connector of a charging cable connected to power supply 200, or a power reception coil that can receive power contactlessly through a magnetic field from a power transmission coil provided on the power supply 200 side.

Charger 80 is connected to the pair of power lines PL1 and NL1 through charging relay 85. Charger 80 converts the power supplied from power supply 200 through power receiver 75 to a voltage level of power storage device 10 and then outputs it to power storage device 10 through the pair of power lines PL1 and NL1. Charger 80 includes an AC/DC converter that converts the AC power received from power supply 200 into direct current and a DC/DC converter that converts an output of the AC/DC converter to the voltage level of power storage device 10.

Charging relay 85 is provided between charger 80 and the pair of power lines PL1 and NL1 and is turned on by ECU 100 during external charging.

Power switch 90 is operable by a user who uses electrically powered vehicle 1. When power switch 90 is operated with a prescribed operation during the stop of the system of the vehicle, a system activation process is performed, so that SMR 20 is turned on and various electrical devices become operable. Contrastingly, when power switch 90 is operated with a prescribed operation during activation of the system, a system stop process is performed, so that various electrical devices stop operations and SMR 20 is turned off. During external charging, for example, when the charging cable of power supply 200 is connected to power receiver 75, power switch 90 is not operated, and SMR 20 and charging relay 85 are turned on and charger 80 becomes operable.

Navigation device 95 stores map information. Navigation device 95 includes a global positioning system (GPS) receiver that identifies a current position of electrically powered vehicle 1 based on a radio wave from an artificial satellite. Navigation device 95 outputs current location information indicating the current position identified by the GPS receiver to ECU 100 in response to a request from ECU 100.

ECU 100 includes a central processing unit (CPU), memories (read only memory (ROM) and random access memory (RAM)), and an input-output buffer (which are not shown). The CPU expands the program stored in the ROM to the RAM or the like and executes the program. A process of ECU 100 is described in the program stored in the ROM.

Description of Downhill-Movement State

Figure 2:
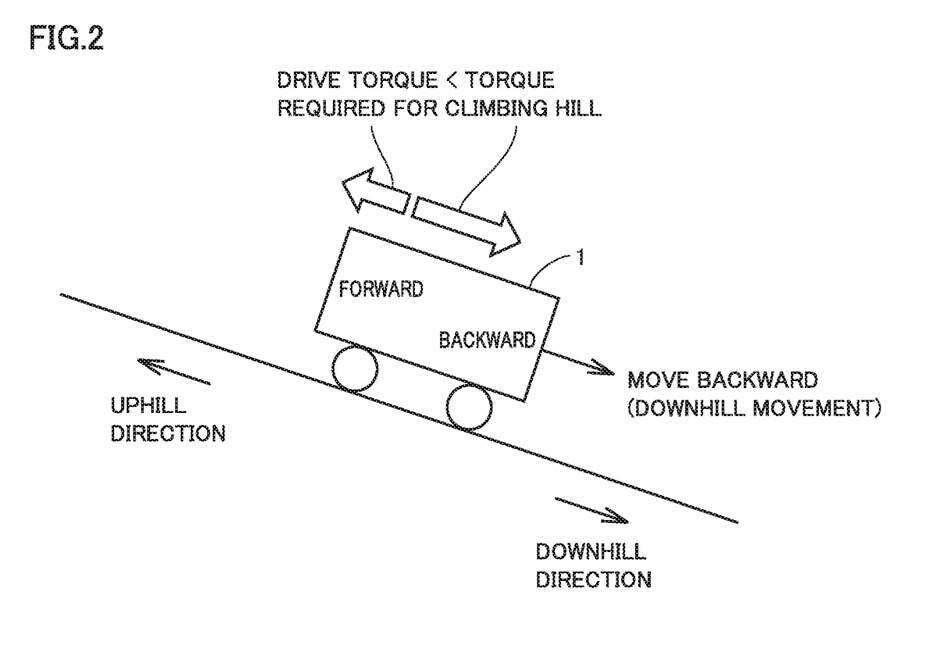
FIG. 2 shows a state in which downhill movement of the electrically powered vehicle occurs on an uphill road.

FIG. 2 shows a state in which downhill movement of electrically powered vehicle 1 occurs on an uphill road. Referring to FIG. 2, when the vehicle drive torque in the uphill direction is lower than the torque required for climbing a hill, electrically powered vehicle 1 moves backward in the downhill direction (downhill-movement state). In this downhill-movement state, the output torque of MG 40 is in the direction in which the vehicle moves forward (hereinafter referred to as "positive direction"), whereas the direction of rotation of MG 40 is a direction in which the vehicle moves backward (hereinafter referred to as "negative direction").

Figure 3:
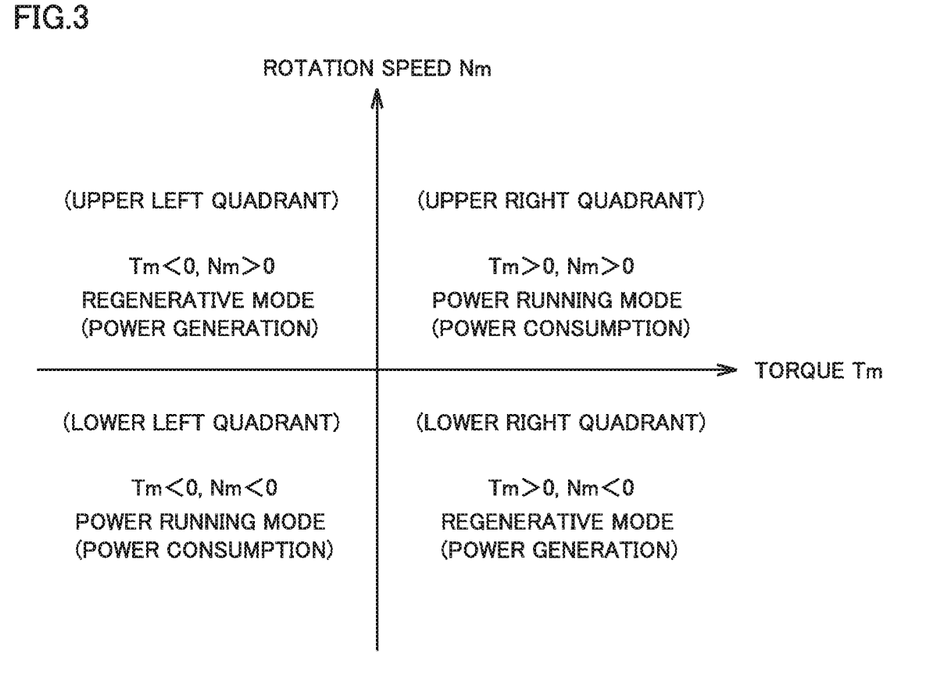
FIG. 3 shows whether output torque and rotation speed of an MG are positive or negative in four divided quadrants.

FIG. 3 shows whether output torque Tm and rotation speed Nm of MG 40 are positive or negative in four divided quadrants. Referring to FIG. 3, in an upper right quadrant in which both of output torque Tm and rotation speed Nm are positive, the directions (signs) of output torque Tm and rotation speed Nm coincide with each other, and accordingly, MG 40 enters the power running mode (power consumption). In an upper left quadrant in which output torque Tm is negative and rotation speed Nm is positive, the directions (signs) of output torque Tm and rotation speed Nm differ from each other, and accordingly, MG 40 enters the regenerative mode (power generation). Similarly, in a lower left quadrant in which both of output torque Tm and rotation speed Nm are negative, MG 40 enters the power running mode (power consumption). In a lower right quadrant in which output torque Tm is positive and rotation speed Nm is negative, MG 40 enters the regenerative mode (power generation).

Referring again to FIG. 2, the output torque of MG 40 is positive and the rotation speed of MG 40 is negative in the shown state, and thus, MG 40 enters the regenerative mode to generate power (lower right quadrant in FIG. 3). Although not shown, the downhill-movement state also occurs when electrically powered vehicle 1 moves in the downhill direction while climbing a hill in reverse (upper left quadrant in FIG. 3).

When the downhill-movement state occurs, MG 40 enters the regenerative mode, and accordingly, power storage device 10 is charged to increase the SOC. Power storage device 10 experience accelerated degradation when being left in the high SOC state for a long period of time. In the present embodiment, thus, an upper control limit of the SOC for reducing such accelerated degradation is set, causing ECU 100 to control charging of power storage device 10 such that the SOC does not exceed the upper control limit.

Figure 4:
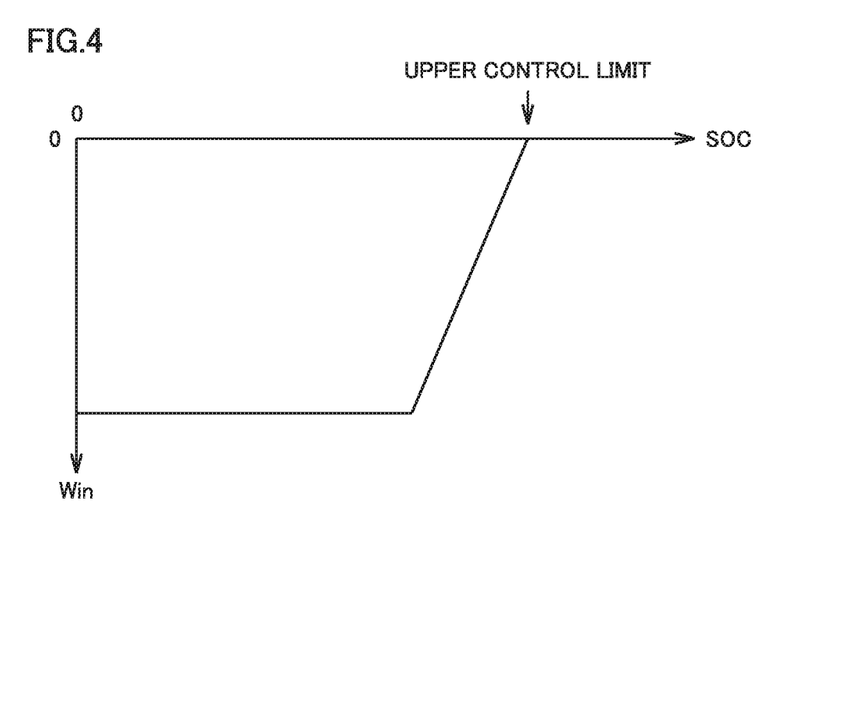
FIG. 4 shows an example relationship between allowable charging power and SOC of a power storage device.

FIG. 4 shows one example relationship between allowable charging power Win and SOC of power storage device 10. Allowable charging power Win represents a maximum value of the power that can be received by power storage device 10, and allowable charging power Win of zero means that power storage device 10 cannot be charged. FIG. 4 shows one example relationship between allowable charging power Win and SOC in the absence of downhill movement of the vehicle.

Referring to FIG. 4, when the SOC exceeds a prescribed value (prescribed value<upper control limit), the magnitude of allowable charging power Win decreases as the SOC increases. Then, when the SOC reaches the upper control limit, allowable charging power Win is zero, so that power storage device 10 cannot be charged.

When the SOC reaches the upper control limit in the presence of the downhill-movement state, power storage device 10 cannot be charged, so that in the current state, MG 40 in the regenerative mode can no longer output torque in the uphill direction. The situation in which MG 40 cannot output torque in the uphill direction is desired to be resolved immediately.

In electrically powered vehicle 1 according to the present embodiment, thus, when the downhill-movement state occurs on the uphill road, ECU 100 allows charging of power storage device 10 in which the SOC exceeds the upper control limit. This avoids a situation in which the SOC reaches the upper control limit, and accordingly, power storage device 10 cannot be charged and MG 40 cannot output torque (regenerative torque) in the uphill direction. This allows MG 40 to output torque (regenerative torque) in the uphill direction and escape from the downhill-movement state.

Figure 5:
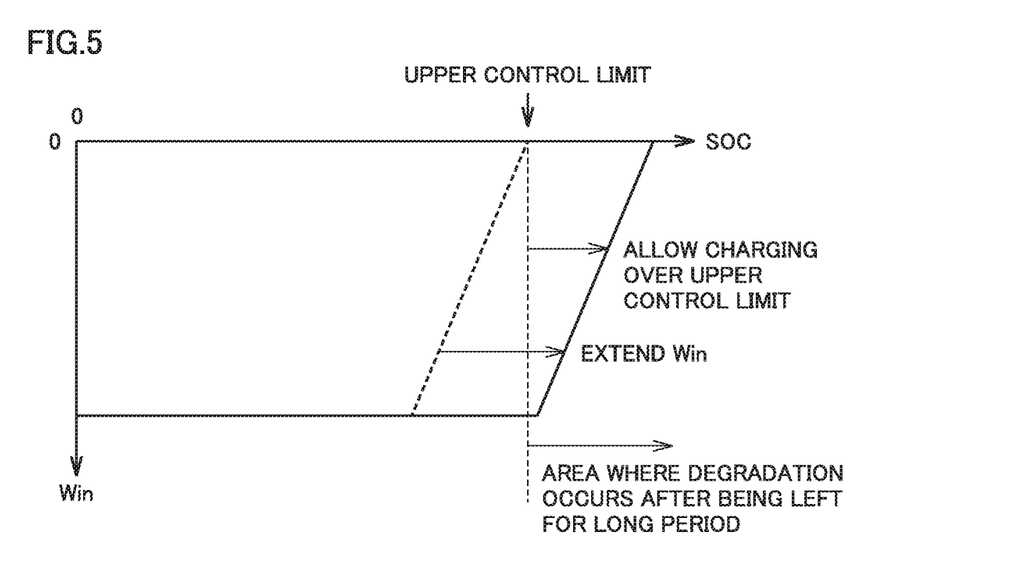
FIG. 5 shows an example relationship between allowable charging power and SOC at the occurrence of downhill movement of a vehicle.

FIG. 5 shows one example relationship between allowable charging power Win and SOC in the downhill-movement state. Referring to FIG. 5, when the downhill-movement state occurs, allowable charging power Win is extended to the high SOC side as shown. Specifically, charging in which the SOC exceeds the upper control limit is allowed. The upper control limit of the SOC is a limiting value set for reducing advanced degradation of power storage device 10 which is caused by power storage device 10 being left for a long period of time in the high SOC state, and charging over the upper control limit per se is possible. In the present embodiment, thus, allowable charging power Win is extended to the high SOC side at the occurrence of the downhill-movement state. This allows charging in which the SOC exceeds the upper control limit.

At the occurrence of the downhill-movement state, allowable charging power Win may be extended to the high SOC side, and a restriction on charging of power storage device 10 by allowable charging power Win may be removed. Specifically, the magnitude of allowable charging power Win may be increased. This allows high charging power, thus increasing the torque (regenerative torque) in the uphill direction which is generated by MG 40. Consequently, downhill movement of the vehicle can be resolved, allowing the vehicle to climb a hill.

When the downhill-movement state is resolved, allowable charging power Win returns to the state before it has been extended to the high SOC side. After the downhill-movement state is resolved, MG 40 consumes power to generate power running torque (upper right or lower left quadrant in FIG. 3), and power storage device 10 enters the discharged state. Thus, even when allowable charging power Win is returned with the SOC exceeding the upper control limit, the outputs of power storage device 10 and MG 40 are not affected.

When the downhill-movement state is resolved, power storage device 10 is discharged, so that the SOC basically decreases. In some cases, however, the vehicle system may be stopped, for example, upon arrival at a destination before the SOC decreases to be lower than or equal to the upper control limit. The degradation of power storage device 10 may be accelerated when power storage device 10 is left for a long period of time in the high SOC state in which the SOC exceeds the upper control limit.

Considering the above, in electrically powered vehicle 1 according to the present embodiment, when a request to stop the system of the vehicle is made in the high SOC state, a discharge process of discharging power storage device 10 is performed assuming that power storage device 10 is highly likely to be left in the high SOC state for a long period of time. For example, the SOC is decreased to the upper control limit through the discharge process. This reduces the advanced degradation of power storage device 10 which is caused by power storage device 10 being left in the high SOC state for a long period of time.

Various techniques can be used in the discharge process performed during the stop of the system. In one example, the equalization circuit provided in power storage device 10 can be used to perform the discharge process in the present embodiment. Since the equalization circuit is provided in power storage device 10, even after SMR 20 is turned off in response to the request to stop the system and power storage device 10 is accordingly separated from the electrical system, power storage device 10 can be discharged using the equalization circuit in power storage device 10.

Specifically, power storage device 10 is a battery pack including a plurality of cells, and the equalization circuit is originally provided to equalize the power storage amounts among the cells when the power storage amounts among the cells loose balance. This equalization circuit can be used to resolve the high SOC state of power storage device 10.

Figure 6:
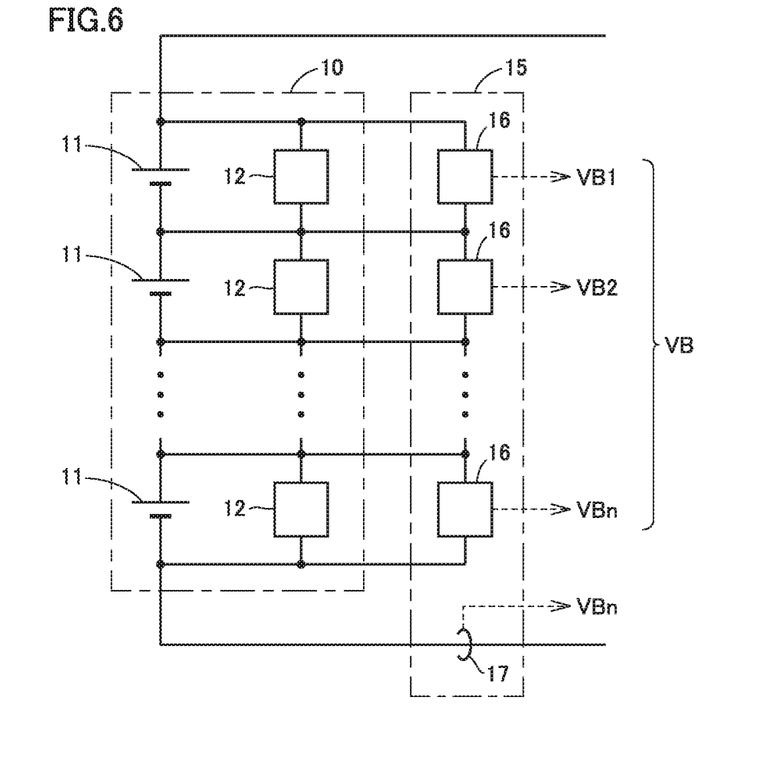
FIG. 6 shows an example circuit configuration of the power storage device.

FIG. 6 shows an example circuit configuration of power storage device 10. Referring to FIG. 6, power storage device 10 includes a plurality of series-connected cells 11 and a plurality of discharge circuits 12 provided in parallel to cells 11. Discharge circuits 12 correspond to the equalization circuit.

Figure 7:
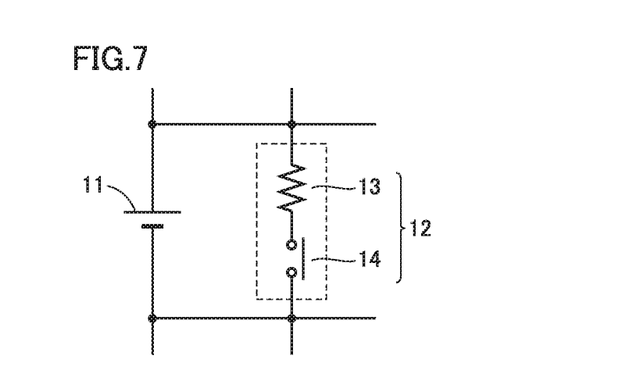
FIG. 7 shows an example configuration of a discharge circuit shown in FIG. 6.

FIG. 7 shows one example configuration of discharge circuit 12 shown in FIG. 6. Referring to FIG. 7, discharge circuit 12 includes a resistive element 13 and a switching element 14 connected in series with resistive element 13. Switching element 14 is controlled by ECU 100 and can turn on switching element 14 to discharge cell 11.

Referring again to FIG. 6, sensor unit 15 includes a plurality of voltage sensors 16, each of which detects the voltage across a corresponding one of cells 11, and a current sensor 17 that detects a current 1B flowing through cell 11. For example, when it is determined that a specific cell 11 has a voltage higher than the voltage across another cell 11 and the specific cell 11 has a power storage amount higher than the power storage amount of the other cell 11, discharge circuit 12 corresponding to the specific cell 11 is operated to discharge the specific cell 11. This reduces the power storage amount of the specific cell 11, thereby equalizing the power storage amount of the specific cell 11 with that of the other cell 11.

Since the equalization circuit can discharge each cell 11 as described above, in the present embodiment, this equalization circuit is used to perform the discharge process of discharging power storage device 10 during the stop of the system. For example, when a request to stop the system of the vehicle is made in the high SOC state, all of discharge circuits 12 may be operated uniformly, or a discharge circuit 12, which corresponds to a cell 11 having a power storage amount relatively higher than that of another cell 11, may be operated preferentially.

In the discharge process performed during the stop of the system, an electrical load such as MG 40 or electrically powered air conditioner 55 can be used, in addition to the equalization circuit described above. For example, flowing current through MG 40 by controlling inverter 34 can discharge power storage device 10. When current is flowed through MG 40, inverter 34 is controlled to flow a d-axis current alone, thus discharging power storage device 10 without generating rotary torque in MG 40. Also, operating the compressor of electrically powered air conditioner 55 can discharge power storage device 10. Although not shown, when a heater or the like for heating, which uses the power stored in power storage device 10, is provided, the heater or the like can be operated to discharge power storage device 10 as well.

Such electrical loads can no longer receive power from power storage device 10 when SMR 20 is turned off. Thus, the discharge process using such electrical loads is performed in a period between a system stop request made by the operation of power switch 90 and turning-off of SMR 20. Even when the request to stop the system is made by operating power switch 90, SMR 20 is not turned off immediately, but is turned off after the execution of a prescribed system end process. The discharge process using the above electrical loads is thus executable even after the request to stop the system is made by operating power switch 90.

A discharge circuit, which discharges power storage device 10 when power storage device 10 is in the high SOC state during the stop of the system, may be separately provided between power storage device 10 and SMR 20 (which is not shown). This allows discharging of power storage device 10 after SMR 20 is turned off even when power storage device 10 includes no equalization circuit. Such a discharge circuit can be configured by, for example, connecting a resistive element and a switching element, which are connected in series, between a positive electrode line and a negative electrode line connected to power storage device 10.

Figure 8:
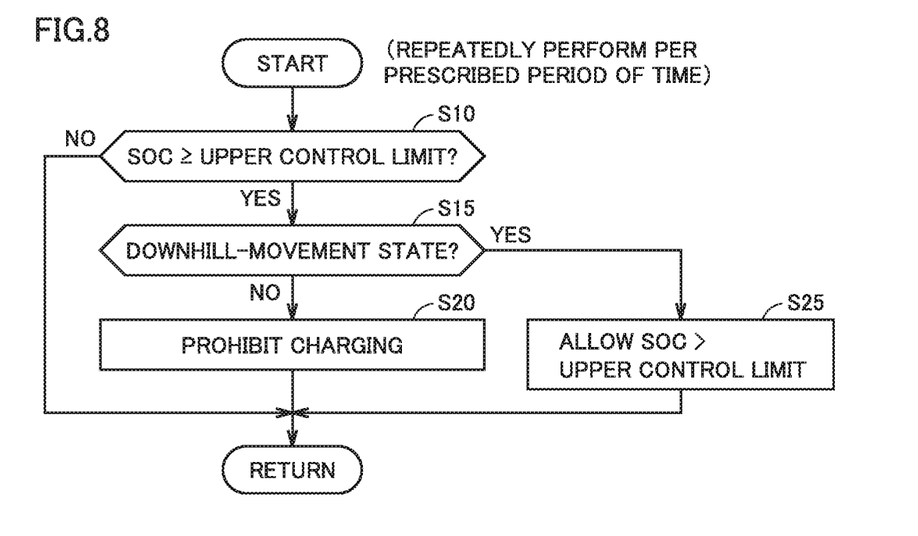
FIG. 8 is a flowchart showing an example procedure of an SOC upper control limit extending process performed by an ECU.

FIG. 8 is a flowchart showing an example procedure of an SOC upper control limit extending process executed by ECU 100. A series of processes shown in this flowchart are repeatedly performed per prescribed period of time during activation of a vehicle system.

Referring to FIG. 8, ECU 100 determines whether the SOC of power storage device 10 is higher than or equal to the upper control limit (step S10). As described above, the upper control limit of the SOC is a limiting value for reducing advanced degradation of power storage device 10 which is caused by power storage device 10 being left in the high SOC state for a long period, which is any appropriate designed value (e.g., 90%).

The SOC is calculated based on a detection value from sensor unit 15. Various known techniques can be used as the way of calculating the SOC, such as a technique using an open circuit voltage (OCV)-SOC curve (e.g., a map) indicating the relationship between OCV and SOC and a technique using an integrated value of charging and discharging currents.

When determining at step S10 that the SOC is lower than the upper control limit (NO at step S10), ECU 100 does not perform a series of processes thereafter and advances the process to RETURN. When determining at step S10 that the SOC is higher than or equal to the upper control limit (YES at step S10), ECU 100 determines whether the downhill-movement state of the vehicle has occurred (step S15).

Whether the downhill-movement state has occurred is determined from a selected shift position and a vehicle speed. Specifically, when a forward position (D position or B position) is selected and the speed is negative (backward), it is determined that the downhill-movement state has occurred. Also when a rearward position (R position) is selected and the speed is positive, it is determined that the downhill-movement state has occurred.

The determination of the downhill-movement state is not limited to this. The direction of rotation of MG 40, drive shaft 45, or the like may be used in place of the vehicle speed. Alternatively, based on the torque command value of MG 40 and the direction of rotation of MG 40, it may be determined that the downhill-movement state has occurred when these have different signs.

Since the SOC has reached the upper control limit, when the downhill-movement state has not occurred (NO at step S15), charging of power storage device 10 is prohibited (step S20). Specifically, when the downhill-movement state has not occurred, the map shown in FIG. 4 which indicates the relationship between allowable charging power Win and SOC is selected, and allowable charging power Win is regarded as zero in accordance with this map.

Contrastingly, when determining that the downhill-movement state has occurred at step S15 (YES at step S15), ECU 100 allows the SOC to exceed the upper control limit (step S25). In this example, ECU 100 extends allowable charging power Win to the high SOC side as shown in FIG. 5. This allows charging over the upper control limit. In order to allow charging over the upper control limit, the upper voltage restriction of power storage device 10 is also increased if necessary. This is because, even when allowable charging power Win is extended to the high SOC side, charging is limited once voltage VB across power storage device 10 reaches the upper limit.

In the above description, whether the downhill-movement state has occurred is determined when it is determined that the SOC is higher than or equal to the upper control limit at step S10, and when the downhill-movement state has occurred, charging in which the SOC exceeds the upper control limit is allowed. Alternatively, the process of step S10 may be omitted. That is to say, when the downhill-movement state has occurred, charging in which the SOC exceeds the upper control limit may be allowed, irrespective of whether the SOC is higher than or equal to the upper control limit.

Figure 9:
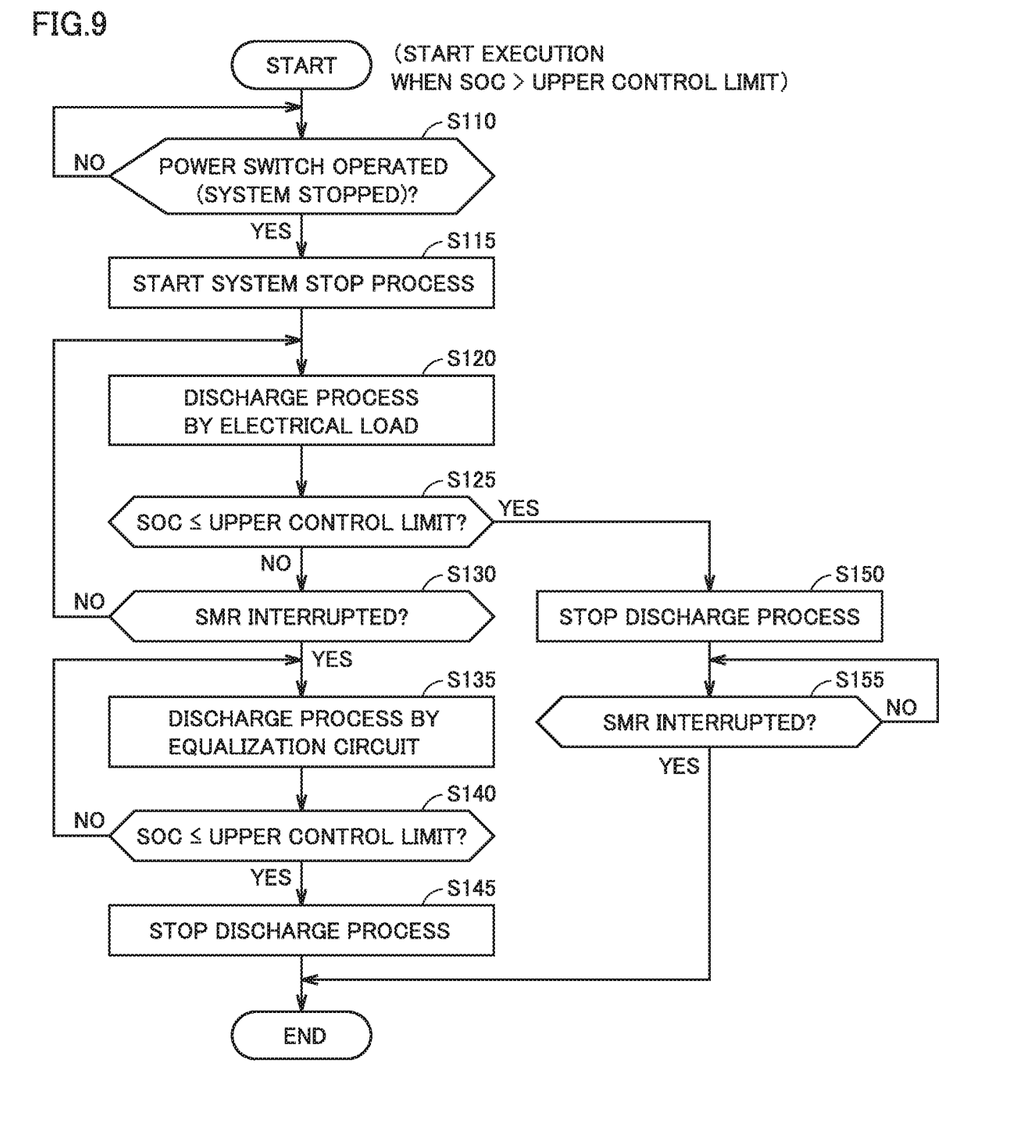
FIG. 9 is a flowchart showing an example procedure of a discharge process performed by the ECU when a request to stop a system of a vehicle is made with the SOC exceeding an upper control limit.

FIG. 9 is a flowchart showing an example procedure of the discharge process performed by ECU 100 when a request to stop the system of the vehicle is made with the SOC exceeding the upper control limit. A series of processes shown in this flowchart are performed when the SOC exceeds the upper control limit.

Referring to FIG. 9, ECU 100 determines whether power switch 90 has been operated with a prescribed operation for stopping the system (step S110). Although not particularly shown, when the SOC is equal to or lower than the upper control limit before power switch 90 is operated, the ECU 100 does not perform a series of processes thereafter and advances the process to END. When power switch 90 is operated with a prescribed operation (YES at step S110), ECU 100 starts a prescribed system stop process (step S115).

ECU 100 then performs the discharge process using an electrical load that receives power from storage device 10 through SMR 20 (step S120). For example, ECU 100 drives inverter 34 to flow current through MG 40 (preferably, flow only a d-axis current that generates no torque) or drives the compressor of electrically powered air conditioner 55. The power stored in power storage device 10 is consumed by such an electrical load, thereby discharging power storage device 10.

ECU 100 then determines whether the SOC has become lower than or equal to the upper control limit (step S125). When the SOC is higher than the upper control limit (NO at step S125), ECU 100 determines whether SMR 20 has been interrupted (step S130). When SMR 20 is not interrupted (NO at step S130), ECU 100 returns the process to step S120 and continues the discharge process using the electrical load.

When the SOC is lower than or equal to the upper control limit through the discharge process using the electrical load (YES at step S125), ECU 100 stops the discharge process (step S150). Specifically, ECU 100 stops the electrical load operated for discharging power storage device 10 at step S120. When SMR 20 is interrupted (YES at step S155), then, ECU 100 advances the process to END.

When determining that SMR 20 is interrupted at step S130 (YES at step S130), ECU 100 ends the discharge process using the electrical load and performs the discharge process by the equalization circuit of power storage device 10 (step S135). Specifically, ECU 100 drives the equalization circuit to cause the equalization circuit to discharge each cell 11.

ECU 100 then determines whether the SOC is lower than or equal to the upper control limit (step S140). When the SOC is still higher than the upper control limit (NO at step S140), ECU 100 returns the process to step S135 and continues the discharge process by the equalization circuit.

When the SOC is lower than or equal to the upper control limit through the discharge process by the equalization circuit (YES at step S140), ECU 100 stops the discharge process (step S145). Specifically, ECU 100 brings the equalization circuit into the non-operating state. ECU 100 subsequently advances the process to END.

In the present embodiment, charging in which the SOC exceeds the upper control limit is allowed when the downhill-movement state occurs on the uphill road, as described above. This avoids a situation in which MG 40 cannot output torque (regenerative torque) in the uphill direction. Consequently, MG 40 can output torque in the uphill direction, and accordingly can escape from the downhill-movement state.

When charging in which the SOC exceeds the upper control limit is allowed to leave power storage device 10 in the high SOC state for a long period of time, degradation of power storage device 10 is accelerated. In the present embodiment, the discharge process of discharging power storage device 10 is performed when a request to stop the system of the vehicle is made in the high SOC state. This reduces accelerated degradation of power storage device 10 which is caused by power storage device 10 being left in the high SOC state.

In the present embodiment, the discharge process is performed using the equalization circuit of power storage device 10 after SMR 20 is turned off in response to the request to stop the system. Even after SMR 20 is turned off in response to the request to stop the system, thus, power storage device 10 can be discharged.

In the present embodiment, the discharge process is performed using the electrical load such as MG 40 or electrically powered air conditioner 55 until SMR 20 is turned off in response to the request to stop the system. This allows power storage device 10 to be discharged also before SMR 20 is turned off in response to the request to stop the system. Thus, the discharge process is performed immediately after the request to stop the system, thereby stopping the system.

Modification 1

Although the discharge process using MG 40 or electrically powered air conditioner 55 is performed in the present embodiment, power storage device 10 may be discharged by feeding power from power storage device 10 through DC/DC converter 60 to auxiliary machine 70. When the auxiliary machine battery of auxiliary machine 70 has room for charging, the power discharged from power storage device 10 is not discarded and can be stored in the auxiliary machine battery.

Figure 10:
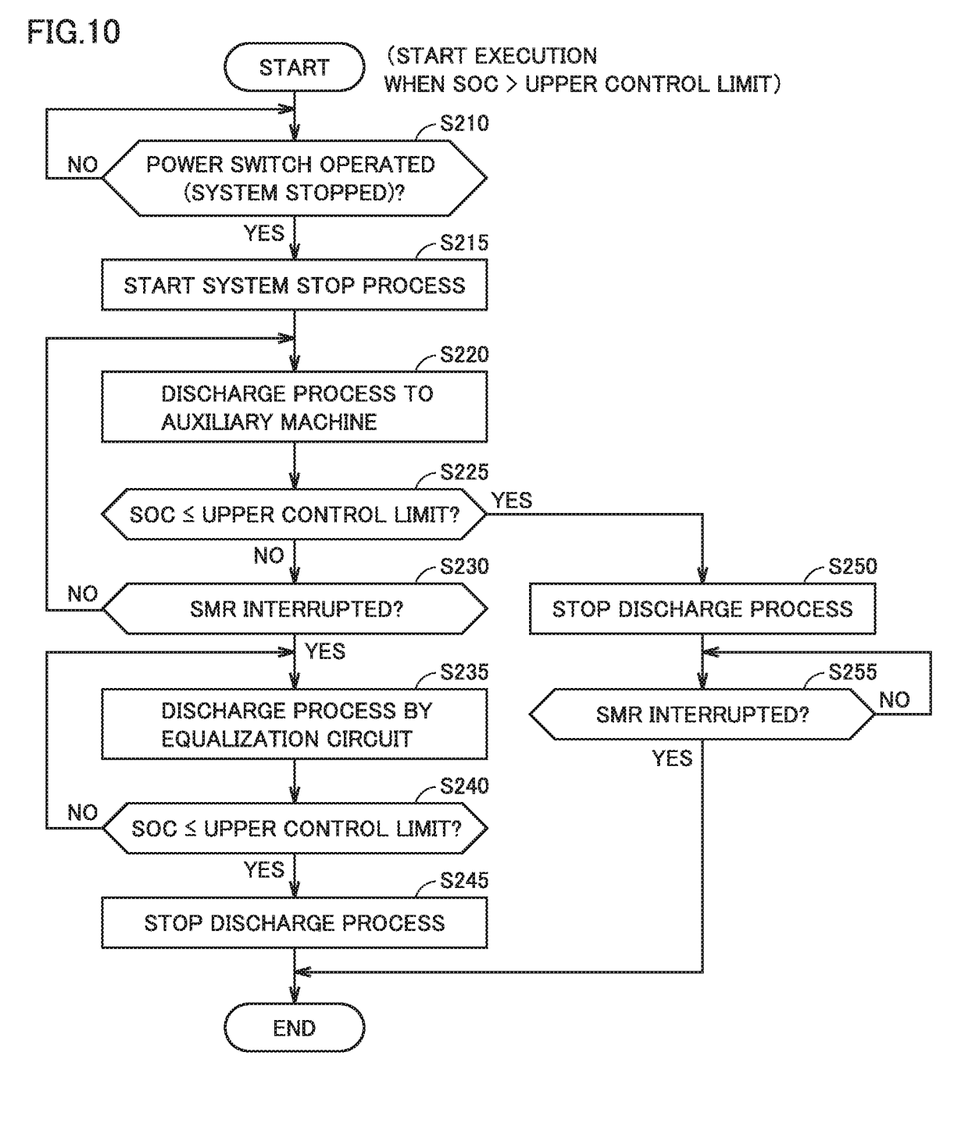
FIG. 10 is a flowchart showing an example procedure of a discharge process in Modification 1.

FIG. 10 is a flowchart showing an example procedure of the discharge process in Modification 1. This flowchart corresponds to FIG. 9 described in the above present embodiment. Referring to FIG. 10, the processes of steps S210, S215, and S225 to S255 shown in this flowchart are identical to the processes of steps S110, S115, and S125 to S155 shown in FIG. 9, respectively. This flowchart includes step S220 in place of step S120 shown in the flowchart of FIG. 9.

That is to say, when a prescribed system stop process is started at step S215, ECU 100 performs the discharge process to auxiliary machine 70 (step S220). Specifically, ECU 100 drives DC/DC converter 60 such that power storage device 10 feeds power to auxiliary machine 70 through DC/DC converter 60. ECU 100 then advances the process to step S225. This driving of DC/DC converter 60 is continued until the SOC decreases to the upper control limit (YES at step S225) or SMR 20 is interrupted (YES at step S230).

When the auxiliary machine battery of auxiliary machine 70 has no room for charging (e.g., when the voltage across the auxiliary machine battery has reached the upper limit), the discharge process to auxiliary machine 70 may be replaced by the discharge process using the electrical load such as MG 40 or electrically powered air conditioner 55.

Modification 1 uses auxiliary machine 70 in place of the electrical load for the discharge process before SMR 20 is turned off in response to a request to stop the system, thereby performing the discharge process without discarding the power stored in power storage device 10.

Modification 2

Although the discharge process is performed immediately after a request to stop the system is made in the high SOC state in the above present embodiment and Modification 1, the degradation of the power storage device is not accelerated immediately after the power storage device enters the high SOC state but is accelerated when the power storage device is left in the high SOC state for a long period of time. In Modification 2, thus, the discharge process is performed after a while when a request to stop the system is made in the high SOC state, and the discharge process is not performed when the system is activated before the execution of the discharge process. This allows, while reducing accelerated degradation of the power storage device which is caused by the power storage device being left in the high SOC state for a long period of time, the power stored in the power storage device to be effectively used in, for example, traveling after the activation of the system when the system is activated in a short period of time after the stop of the system.

Figure 11:
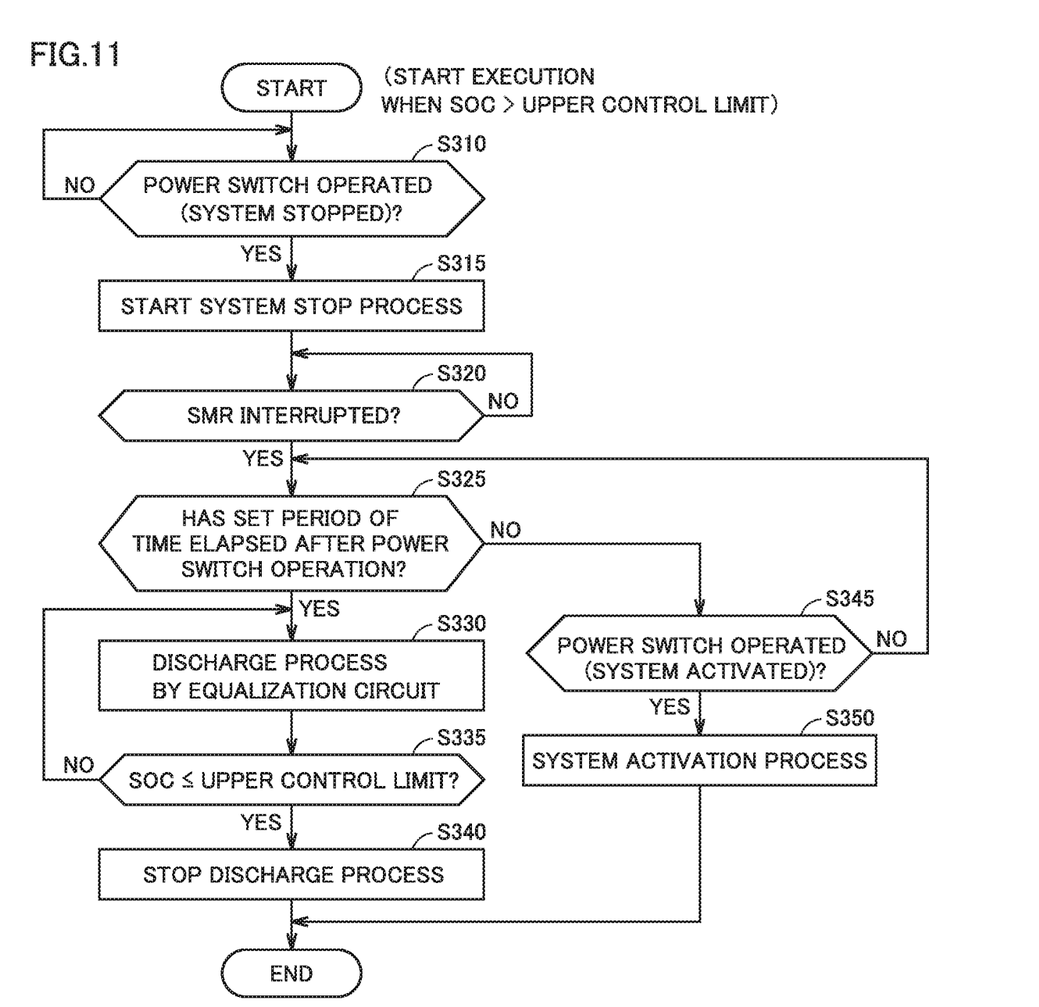
FIG. 11 is a flowchart showing an example procedure of a discharge process in Modification 2.

FIG. 11 is a flowchart showing an example procedure of the discharge process in Modification 2. This flowchart also corresponds to FIG. 9 described in the above embodiment. Referring to FIG. 11, the processes of steps S310, S315, and S330 to S340 shown in this flowchart are identical to the processes of steps S110, S115, and S135 to S145 shown in FIG. 9, respectively. This flowchart includes steps S320, S325, S340, and S350 in place of steps S120 to S130, S150, and S155 shown in the flowchart of FIG. 9.

That is to say, when a prescribed system stop process is started at step S315, ECU 100 determines whether SMR 20 has been interrupted (step S320). When SMR 20 is interrupted (YES at step S320), ECU 100 determines whether a set period of time has elapsed from the operation (operation at step S310) of power switch 90 (step S325).

This set period of time defines the timing at which the discharge process is performed, which may be a period of time set in advance at, for example, a design stage based on the accelerated degradation situation of power storage device 10 when power storage device 10 is left in the high SOC state, or may be a period of time set by the user based on the vehicle usage situation.

Until the set period of time has elapsed (NO at step S325), ECU 100 determines whether power switch 90 has been operated with a prescribed operation for activating the system (step S345). When power switch 90 is operated with the prescribed operation for activating the system (YES at step S345), ECU 100 performs a prescribed system activation process (step S350), and then advances the process to END. That is to say, when the system is activated before the set period of time has elapsed after the stop of the system (after the operation of power switch 90), the discharge process of step S330 is not performed.

Contrastingly, when determining that the set period of time has elapsed at step S325 (YES at step S325), ECU 100 advances the process to step S330 and performs the discharge process by the equalization circuit. This reduces accelerated degradation of the power storage device which is caused by the power storage device being left in the high SOC state for a long period of time.

Modification 2 allows, while reducing accelerated degradation of power storage device 10 which is caused by power storage device 10 being left in the high SOC state for a long period of time, the power stored in power storage device 10 to be effectively used after activation of the system when a request to activate the system is made in a short period of time after the stop of the system.

Modification 3

In Modification 3, whether to perform the discharge process based on the current position acquired by navigation device 95 is determined when a request to stop the system is made in the high SOC state. For example, when a request to stop the system is made in one's home, a company, or the like, a stop for a long period of time after the stop of the system is expected. Contrastingly, when a request to stop the system is made in, for example, a parking lot of a convenience store, it is expected that the system will be activated again in a short period of time after the stop of the system.

In Modification 3, thus, a location in which the discharge process is performed when a request to stop the system is made in the high SOC state is set as a prescribed location. For example, one's home or company in which a stop for a long period of time is expected can be set as the prescribed location. If the current position is not the prescribed location even when a request to stop the system is made in the high SOC state, the discharge process is not performed assuming that the system is highly likely to be activated again in a short period of time after the stop of the system.

This allows, while reducing accelerated degradation of power storage device 10 which is caused by power storage device 10 being left in the high SOC state in one's home, company, or the like for a long period of time, the power stored in power storage device 10 to be effectively used after activation of the system when a request to activate the system is made in a short period of time after the stop of the system, as in the case where the vehicle is parked at a convenience store or the like which is not set as the prescribed location.

Figure 12:
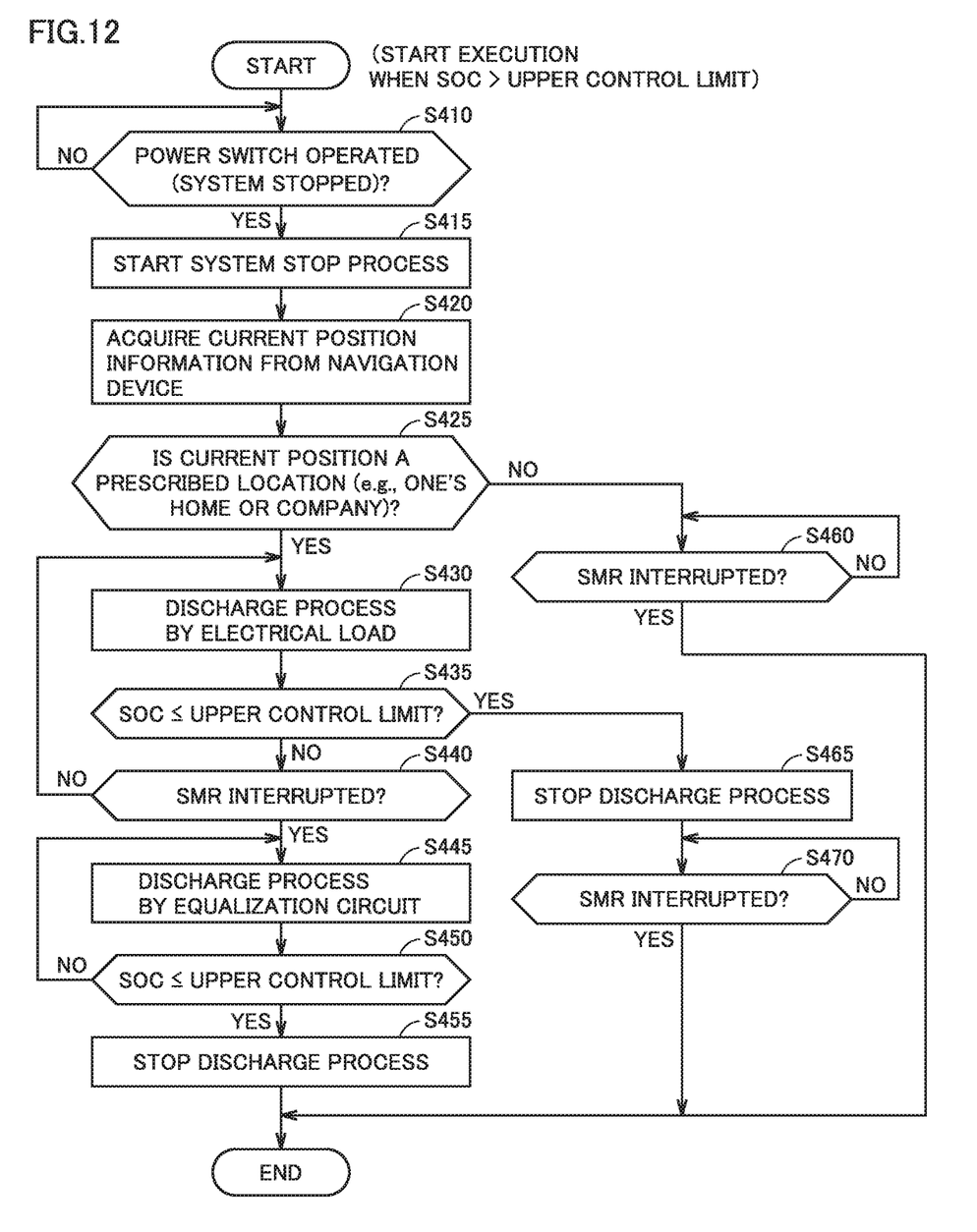
FIG. 12 is a flowchart showing an example procedure of a discharge process in Modification 3.

FIG. 12 is a flowchart showing an example procedure of the discharge process in Modification 3. This flowchart also corresponds to FIG. 9 described in the above embodiment. Referring to FIG. 12, the processes of steps S410, S415, S430 to S455, S465, and S470 shown in this flowchart are identical to the processes of steps S110 to S155 shown in FIG. 9, respectively. This flowchart further includes steps S420, S425, and S460 in addition to the steps of the flowchart of FIG. 9.

That is to say, when a prescribed system stop process is started at step S415, ECU 100 acquires the information about a current position of electrically powered vehicle 1 from navigation device 95 (step S420). ECU 100 then determines whether the acquired current position is the prescribed location where the acquired current position is set (step S425). One's home, company, or the like where a stop for a long period of time is expected is set as the prescribed location as described above.

When determining that the current position is the prescribed location (YES at step S425), ECU 100 advances the process to step S430 and performs the discharge process by the electrical load.

Contrastingly, when determining that the current position is not the set prescribed location at step S425 (NO at step S425), ECU 100 determines whether SMR 20 has been interrupted (step S460). Subsequently, when SMR 20 is interrupted (YES at step S460), ECU 100 advances the process to END. That is to say, the discharge process of step S430 or step S445 is not performed when the current position is not the prescribed location.

Although the discharge process by the electrical load is performed at step S430 in the above description, the discharge process by the electrical load may be replaced by the discharge process to auxiliary machine 70 as in Modification 1.

Modification 3 allows, while reducing accelerated degradation of power storage device 10 which is caused by power storage device 10 being left in the high SOC state in one's home, company, or the like for a long period of time, the power stored in power storage device 10 to be effectively used after activation of the system when a request to activate the system is made in a short period of time after the stop of the system, as in a stop in a convenience store or the like which is not set as the prescribed location.

Although the embodiment and modifications have given the description assuming that electrically powered vehicle 1 is an electric vehicle (EV), the electrically powered vehicle according to the present disclosure may be a hybrid vehicle (HV). The HV may be a plug-in HV that can charge the power storage device from a power supply outside the vehicle.

For example, the series HV and series-parallel (also referred to as split) HV including a plurality of onboard MGs create a situation in which, in the event of the downhill-movement state of a vehicle during the stop of the engine, an MG (hereinafter referred to as "second MG") different from a running MG (hereinafter referred to as "first MG") outputs power running torque and rotates the engine whose fuel has been cut, thereby consuming power. The HVs accordingly cause the second MG to consume the power generated by the first MG which accompanies downhill movement of the vehicle, to thereby secure the torque output of the first MG. However, since the torque output from the second MG is in an amount corresponding to an engine friction, the second MG may fail to sufficiently consume the power generated by the first MG, and the first MG may accordingly fail to output the torque required for the vehicle to escape from the downhill-movement state.

Since the present disclosure allows charging in which the SOC exceeds the upper control limit as described above, the vehicle can escape from the downhill-movement state by securing torque in the uphill direction by the first MG, and further, accelerated degradation of power storage device 10 which is caused by power storage device 10 being left in the high SOC state can be reduced.

Although the present disclosure has been described and illustrated in detail, it is clearly understood that the same is by way of illustration and example only and is not to be taken by way of restriction, the scope of the present disclosure being interpreted by the terms of the appended claims.

What is claimed is:

1. An electrically powered vehicle comprising:
   a power storage device;
   a motor generator configured to generate travel torque using power stored in the power storage device and generate power for charging the power storage device;
   a system main relay (SMR) configured to control power from the power storage device; and
   a controller configured to control the charging of the power storage device such that a state of charge (SOC) of the power storage device does not exceed a prescribed upper control limit, wherein
   the power storage device includes
      a plurality of cells, and
      an equalization circuit configured to individually discharge each of the plurality of cells for equalizing storage power amounts of the plurality of cells,
   the controller is configured to:
      when the electrically powered vehicle moves in a downhill direction with the motor generator generating travel torque in an uphill direction on an uphill road, allow charging in which the SOC exceeds the upper control limit,
      when a request to stop a system of the electrically powered vehicle is made by a user by switching the SMR to an off position, with the SOC exceeding the upper control limit by allowing charging in which the SOC exceeds the upper control limit at occurrence of a movement in the downhill direction, perform a discharge process of discharging the power storage device after a lapse of a prescribed period of time from the request to stop the system,
      when the request to activate the system of the electrically powered vehicle is made before a lapse of the prescribed period of time, not perform the discharge process, and
      when the request to stop the system of the electrically powered vehicle is not made by the user, with the SOC exceeding the upper control limit by allowing charging in which the SOC exceeds the upper control limit at occurrence of the movement in the downhill direction, not perform the discharge process,
   wherein the discharge process is a process of operating the equalization circuit or a process of discharging the power storage device by operating an electric device that receives power from the power storage device.

2. The electrically powered vehicle according to claim 1, wherein the controller is configured to, when the electrically powered vehicle moves in the downhill direction with the motor generator generating the travel torque in the uphill direction on the uphill road, remove a restriction on the charging of the power storage device by allowable charging power indicating a maximum value of power receivable by the power storage device.

3. The electrically powered vehicle according to claim 1, wherein the SMR is provided between the power storage device and the electric device, wherein
   the controller is configured to perform the process of operating the equalization circuit after the SMR is turned off in response to the request to stop the system.

4. The electrically powered vehicle according to claim 3, wherein
   the controller is configured to:
   when the request to stop the system is made, turn off the SMR after performing the discharge process, and perform the process of discharging the power storage device by operating the electric device, until the SMR is turned off in response to the request to stop the system.

5. An electrically powered vehicle comprising:
a power storage device;
a motor generator configured to generate travel torque using power stored in the power storage device and generate power for charging the power storage device;
a system main relay (SMR) configured to control power from the power storage device;
a controller configured to control the charging of the power storage device such that a state of charge (SOC) of the power storage device does not exceed a prescribed upper control limit; and
a navigation device having map information, wherein
the power storage device includes
  a plurality of cells, and
  an equalization circuit configured to individually discharge each of the plurality of cells for equalizing storage power amounts of the plurality of cells,
the controller is configured to:
  when the electrically powered vehicle moves in a downhill direction with the motor generator generating travel torque in an uphill direction on an uphill road, allow charging in which the SOC exceeds the upper control limit,
  when a request to stop a system of the electrically powered vehicle is made by a user by switching the SMR to an off position, with the SOC exceeding the upper control limit by allowing charging in which the SOC exceeds the upper control limit at occurrence of a movement in the downhill direction, acquire information about a current position of the electrically powered vehicle from the navigation device,
  when the current position is a set prescribed location, perform a discharge process of discharging the power storage device,
  when the current position is not the prescribed location, not perform the discharge process, and
  when the request to stop the system of the electrically powered vehicle is not made by the user, with the SOC exceeding the upper control limit by allowing charging in which the SOC exceeds the upper control limit at occurrence of the movement in the downhill direction, not perform the discharge process,
wherein the discharge process is a process of operating the equalization circuit or a process of discharging the power storage device by operating an electric device that receives power from the power storage device.

* * * * *